US011456571B2

(12) United States Patent
Giunta et al.

(10) Patent No.: US 11,456,571 B2
(45) Date of Patent: Sep. 27, 2022

(54) OPTICAL FREQUENCY COMB ASSEMBLY AND METHOD

(71) Applicants: Michele Giunta, Munich (DE); Wolfgang Hänsel, Munich (DE); Ronald Holzwarth, Gröbenzell (DE)

(72) Inventors: Michele Giunta, Munich (DE); Wolfgang Hänsel, Munich (DE); Ronald Holzwarth, Gröbenzell (DE)

(73) Assignee: Menlo Systems GmbH, Martinsried (DE)

( * ) Notice: Subject to any disclaimer, the term of this patent is extended or adjusted under 35 U.S.C. 154(b) by 405 days.

(21) Appl. No.: 16/811,587

(22) Filed: Mar. 6, 2020

(65) Prior Publication Data

US 2020/0287344 A1 Sep. 10, 2020

(30) Foreign Application Priority Data

Mar. 7, 2019 (EP) .................................... 19161343

(51) Int. Cl.
*H01S 3/23* (2006.01)
*H01S 3/13* (2006.01)
(Continued)

(52) U.S. Cl.
CPC ............ *H01S 3/1307* (2013.01); *G02F 1/353* (2013.01); *H01S 3/1106* (2013.01);
(Continued)

(58) Field of Classification Search
CPC .... H01S 3/1106; H01S 3/1301; H01S 3/1305; H01S 3/1307; H01S 3/2308;
(Continued)

(56) References Cited

U.S. PATENT DOCUMENTS

| 6,724,788 B1 | 4/2004 | Holzwarth et al. |
| 6,785,303 B1 | 8/2004 | Holzwarth et al. |

(Continued)

FOREIGN PATENT DOCUMENTS

| DE | 19911103 A1 | 9/2000 |
| DE | 10044404 A1 | 4/2002 |

(Continued)

OTHER PUBLICATIONS

European Search Report issued in corresponding European Application No. 19161343.9, dated Oct. 7, 2019 (7 pages).

(Continued)

*Primary Examiner* — Michael Carter
(74) *Attorney, Agent, or Firm* — Flynn Thiel, P.C.

(57) ABSTRACT

Operating an optical frequency comb assembly includes operating an optical frequency comb source to generate laser light constituting an optical frequency comb and introducing the laser light into a common light path and seeding at least one branch light path by the laser light from the common light path, the branch light path comprising at least one optical element. For the branch light path, a phase difference of a first frequency mode $v_1$ of the optical frequency comb is determined between laser light coupled out at a reference point within the frequency comb assembly upstream of the at least one optical element and laser light coupled out at a measurement point provided in the branch light path downstream of the at least one optical element. Phase correction for the laser light from the branch light path is based on a deviation of the determined phase difference from a target value.

22 Claims, 6 Drawing Sheets

(51) Int. Cl.
*G02F 1/35* (2006.01)
*H01S 3/11* (2006.01)

(52) U.S. Cl.
CPC .......... *H01S 3/1301* (2013.01); *H01S 3/1305* (2013.01); *H01S 3/2308* (2013.01); *H01S 3/2391* (2013.01); *G02F 2203/50* (2013.01); *H01S 3/2383* (2013.01)

(58) Field of Classification Search
CPC ...... H01S 3/2383; H01S 3/2391; G02F 1/353; G02F 2203/50
See application file for complete search history.

(56) References Cited

U.S. PATENT DOCUMENTS

| | | | |
|---|---|---|---|
| 7,804,863 | B2 | 9/2010 | Adel et al. |
| 8,995,796 | B2 | 3/2015 | Holzwarth et al. |
| 9,354,485 | B2 | 5/2016 | Fermann et al. |
| 9,705,279 | B2 | 7/2017 | Holzwarth et al. |
| 2012/0200439 | A1* | 8/2012 | Hartl ................ H01S 3/067 356/477 |

FOREIGN PATENT DOCUMENTS

| | | |
|---|---|---|
| DE | 102006023601 A1 | 11/2007 |
| DE | 102011122232 A1 | 6/2013 |
| DE | 102014226973 A1 | 6/2016 |
| EP | 2654142 A1 | 10/2013 |
| WO | 0221644 A2 | 3/2002 |

OTHER PUBLICATIONS

Nemitz, N., Ohkubo, T., Takamoto, M. et al. Frequency ratio of Yb and Sr clocks with 5 x 10-17 uncertainty at 150 seconds averaging time. Nature (Photonics 10), vol. 10, Apr. 2016, pp. 258-261 (8 pages).

Gaeta, A.L., Lipson, M. & Kippenberg, T.J. Photonic-chip-based frequency combs. Nature Photonics, vol. 13, Mar. 2019, pp. 158-169 (12 pages).

Isao Morohashi, Takahide Sakamoto, Hideyuki Sotobayashi, Tetsuya Kawanishi, Iwao Hosako, and Masahiro Tsuchiya, "Widely repetition-tunable 200 fs pulse source using a Mach-Zehnder-modulator-based flat comb generator and dispersion-flattened dispersion-decreasing fiber," Optics Letters, vol. 33, No. 11, Jun. 1, 2008, pp. 1192-1194 (3 pages).

Ken Kashiwagi, Yoshiaki Nakajima, Masato Wada, Sho Okubo, and Hajime Inaba, "Multi-branch fiber comb with relative frequency uncertainty at 10-20 using fiber noise difference cancellation," Optic Express vol. 26, No. 7, Apr. 2, 2018, pp. 8831-8840 (10 pages).

* cited by examiner

OPTICAL FREQUENCY COMB ASSEMBLY AND METHOD

CROSS-REFERENCE TO RELATED APPLICATIONS

This claims priority from European Application No. 19161343.9, filed Mar. 7, 2019, the disclosure of which is hereby incorporated by reference in its entirety into this application.

The present invention pertains to the field of optical frequency combs.

Optical frequency combs can, for example, be generated using mode-locked lasers (oscillators) and have equally spaced modes $f_m$ in the in the optical frequency domain, the modes being characterized by the formula $f_m=m \times f_{rep}+f_0$, with m being a natural number and $f_0$ being the offset frequency of the frequency comb. Optical frequency combs are, for example, used in spectroscopy or precise frequency measurements, in particular in optical clocks.

DE 199 11 103 A1 and DE 100 44 404 A1, for example, describe ways of stabilizing an optical frequency comb by acting on the optical resonator of the frequency comb generator to stabilize the mode distance $f_{rep}$ (also called repetition frequency in mode locked lasers) and the offset frequency $f_0$ to provide a stable frequency comb.

It can be convenient to split the output of a frequency comb generator into several light branches to be used in one or more applications. In the light branches, the light may be subject to amplification and to nonlinear processes to specifically tailor the light to the application for which it is used. Such multi-branch systems are especially important for measurements that require optical outputs at vastly different optical frequencies. An example is the comparison of optical clocks based on different atoms or ions. In the article of N. Nemitz et al. in Nature Photonics Vol. 10, No. 4, 2016, neutral Sr atoms and Yb atoms at 698 nm and 578 nm are used. To provide light at the corresponding two optical frequencies it is preferable to use two separate branches. This ensures long-term stable operation with sufficient signal to noise ratio to support low phase noise applications.

In the branches, the light path is subject to environmental variations. Especially detrimental are acoustic noise, temperature variations and mechanical vibrations. They all severely disturb the light paths and cause phase variations in the light that travels in the different branches. Since frequency is the time derivative of phase, a disturbed phase of a frequency comb results in a frequency comb where the modes are frequency shifted from the original position. For many high precision applications in the 10^-16 range and beyond, this has to be avoided.

In addition, nonlinear optical effects in the light branches, which may be related to or caused by amplification and frequency conversion, for example, may lead to amplitude to phase noise conversion with phase noise being accumulated in the branches and may therefore also destabilize the frequency comb that is output by the light branch.

The article "Multi-branch fiber comb with relative frequency uncertainty at $10^{-20}$ using fiber noise difference cancellation" by K. Kashiwagi et. al. (Optics Express Vol. 26, No. 7, 2018) proposed a way of stabilizing a multi-branch fiber-based frequency comb. An oscillator output pulse was divided into separate branches. Each divided pulse was amplified by an erbium-doped fiber amplifier and was spectrally broadened by a subsequent highly nonlinear fiber. The first branch (CEO-locking branch) was used to stabilize the CEO (carrier-envelope offset) frequency of the oscillator. The article states that fiber noise caused in the CEO-locking branch would be cancelled by the feedback control to the pump laser diode of the oscillator. However, the outputs from the other branches would suffer from different fiber noises originating from the fiber paths which are not common to the CEO-locking branch. To suppress fluctuation due to the fiber noise difference, fiber noise difference cancellation devices based on fiber stretchers were provided in said other branches. The fiber stretchers installed in controlled fiber lengths of said other branches so that residual fiber noise was the same as in the CEO-locking branch. According to the article, the common fiber noise would be cancelled out by the feedback control of the CEO frequency and the repetition frequency.

Although the article states that the feedback control of the offset frequency and the repetition frequency of the oscillator would cancel out common fiber noise, the proposed system appears to be introducing phase noise from the CEO-locking branch into the other branches. Further, intermingling the feedback control for the offset frequency with the phase noise compensation leads to a complex system which may be difficult to handle.

It is an object of the invention to provide a method for operating an optical frequency comb assembly and a corresponding frequency comb assembly allowing for improved phase stability and accuracy in at least one branch light path having at least one optical element in an efficient manner.

This objective is achieved by the subject matter of claim 1 and the subject matter of claim 15. The dependent claims describe advantageous embodiments of the invention.

The method for operating an optical frequency comb assembly according to the invention comprises operating an optical frequency comb source to generate laser light constituting an optical frequency comb and introducing the laser light into a common light path. At least one branch light path which comprises at least one optical element is seeded by the laser light from the common light path. For the at least one branch light path, a phase difference of a first frequency mode $v_1$ of the optical frequency comb between laser light coupled out at a reference point within the frequency comb assembly upstream of the at least one optical element and laser light coupled out at a measurement point provided in the at least one branch light path downstream of the at least one optical element is determined. Phase correction is provided for the laser light from the at least one branch light path based on a deviation of the determined phase difference from a target value.

In detail, the phase correction can be provided based on a time evolution of the deviation of the determined phase difference from the target value.

The path traversed by light running through the at least one branch light path, in particular through the at least one optical element of the branch light path, can be subject to variations, such as environmental variations. For example, acoustic noise, temperature variations and mechanical vibrations can be especially detrimental. They all can severely disturb the light path and cause phase variations in the light that travels in the at least one branch light path. Since frequency is the time derivative of phase, a disturbed phase of a frequency comb results in a frequency comb where the modes are frequency-shifted from the original position. This effect can be at least partially corrected for according to the invention.

As the phase difference of the first frequency mode $v_1$ between the laser light coupled out at the reference point and the laser light coupled out at the measurement point is determined, phase correction for the at least one branch light path takes into account the actual phase noise in the branch light path. Therefore, output of the branch light path having particularly high stability and accuracy can be achieved.

The phase correction can compensate for time-dependent phase instabilities which, due to the frequency being the time derivative of phase, would lead to frequency shift in the comb light traversing the at least one branch light path.

In particular, the phase difference can be determined continuously or semi-continuously, for example cyclically, to be able to appropriately monitor the time evolution of the phase and take same into account for the phase correction, so as to provide time-dependent phase correction, in particular compensating time varying environmental parameters like temperature and humidity or mechanical stress on fibers.

In case of multiple branch light paths, preferably, the first frequency mode $v_1$, at which the phase difference between the laser light coupled out at the reference point and the laser light coupled out at the measurement point is determined, is the same for each branch light path. This makes the method easier to implement, as some measurement equipment may be shared between the branch light paths. However, in principle it would also be conceivable that the first frequency mode $v_1$ is different for each of the branch light paths or for some of the branch light paths.

As stated, the phase correction for the laser light from the at least one branch light path is based on a deviation of the determined phase difference from a target value. The target value may be a predetermined value or may be automatically or manually determined during operation of the optical frequency comb assembly.

The phase correction may compensate for fluctuations in the phase difference between the reference point and the measurement point. It is, however, not required to set the phase difference to a predetermined specific value. Also, it is not required that an exact value of the phase difference is determined. It is sufficient, if the phase difference is determined to a degree that allows comparing different measurements of the phase difference in the same branch light path and to recognize changes thereof.

The optical frequency comb assembly or parts thereof, in particular the common light path and/or the at least one branch light path or parts thereof, may, for example, be implemented as a fiber-optical assembly, a free-space-optical assembly or a waveguide assembly or combinations thereof. In particular, the at least one branch light path can be partially or fully composed of free space components guiding the light in free space, optical fibers made of glass or plastic, waveguide structures like silicon nitrate waveguides on silicon substrate, or combinations thereof.

In a preferred embodiment, the reference point is the same for each of the branch light paths in case of multiple branch light paths. According to such embodiment, only one outcoupling point for coupling out light for the phase measurement at the shared reference point is required for all branch light paths. Preferably, the reference point lies in the common light path before or where the common light path splits into the branch light paths. However, the reference point could, for example, also lie in the common light path after one or more branch light paths have been split off, or could even lie in one of the branch light paths, preferably upstream of the at least one optical element of the branch light path.

Determining the phase difference of the first frequency mode $v_1$ between the laser light coupled out at the reference point and the laser light coupled out at the measurement point preferably comprises measuring a beat signal between reference light and laser light coupled out at the reference point and a beat signal between the reference light and laser light coupled out at the measurement point. By measuring the beat signals, phase information can be easily deduced. The beat signals can, for example, be generated as described in DE 10 2011 122 232 A1, which is incorporated herein by reference in its entirety.

For example, phase extraction from the two beats may comprise reading out the beats with a dead-time free counter and analyzing the data to get the phase. The beats may be sampled with a fast ADC and the phase may be derived by software. Both beats may be sent to a RF mixer and be mixed down to DC to get the phase (analog). Also an error signal may be obtained in quadrature from the two beats.

The reference light can, for example, be provided as continuous laser (CW) light. In particular, the reference light could be provided by an ultra-stable CW laser providing a stable reference for the phase measurement (such as the ORS 1500 of Menlo Systems. Alternatively, the reference light could be derived from the optical frequency comb provided by the optical frequency comb source to the common light path. This removes the need for providing an additional light source for the reference light.

The reference light could, in particular, be generated by submitting the laser light from the frequency comb source to a frequency shifter to introduce a slight frequency shift (typically in the order of a few 10 MHz) allowing for beat detection. Optionally, the laser light intended to serve as reference light could be submitted to frequency filtering. Part of the laser light provided by the optical frequency comb source could be split off, filtered with an appropriate filter to one or a few modes, be amplified, if necessary, and be submitted to a frequency shifter before being used for the beat measurements.

In case of the reference light being derived from the optical frequency comb provided by the optical frequency comb source, it may be sufficient to only measure the beat signal between the reference light and the laser light coupled out at the measurement point. It is not absolutely necessary, but nevertheless possible, to also measure the beat signal between the reference light and the laser light coupled out at the reference point. As the reference light used for measuring the beat signal between the reference light and the laser light coupled out at the measurement point already contains information from the frequency comb supplied to the common light path by the optical frequency comb source, measuring only the one beat signal may allow determining the phase difference between light coupled out at the reference point and the light coupled out at the measurement point with sufficient accuracy. To increase accuracy, it is advantageous to couple out light used as the reference light from the common light path near or at the reference point.

To reduce any destabilizing effects that could be introduced by guiding the laser light coupled out at the reference point and the laser light coupled out at the measurement point for measuring the phase difference, a path to be traversed by the light coupled out at the reference point and a path to be traversed by the light coupled out at the measurement point after being coupled out and before being subjected to the measurement is not more than 20 cm, preferably not more than 10 cm, more preferably not more than 1 cm and even more preferably not more than 0.1 cm, respectively. The same constraints can apply to the connections of a last common node S of the reference laser (ultra-stable CW laser) and the respective measurement devices. In preferred embodiments, a connection length between the common splitting point S of the reference laser and the reference point R and a connection length between the common splitting point S and the measurement point P are is not more than 20 cm, preferably not more than 10 cm, more preferably not more than 1 cm and even more preferably not more than 0.1 cm, respectively.

The at least one optical element provided in the at least one branch light path could be configured to induce an optically non-linear process to laser light traversing the at least one optical element. In particular, the at least one optical element can have at least one element with nonlinear optical properties. This can, for example, allow tailoring the output of the branch light path to the specific needs of a user. In a specific example, nonlinear effects as described above can generate frequency comb light that has a different optical frequency than the original comb light but still fulfills the comb equation $f_m = m \times f_{rep} + f_0$, potentially with modified $f_0$. This allows generating modes for use in an application supplied by the branch light path. As specific examples, the at least one optical element could comprise an amplifier and/or a frequency broadener. The amplifier can preferably be a fiber amplifier with Erbium- or Ytterbium- or Thulium-doped fibers. Erbium-Doped Fiber Amplifiers (EDFAs) are common tools e.g. in the telecommunication industry. However, also semiconductor devices or any other means of amplification can be used.

The at least one optical element provided in the at least one branch light path could be configured to induce a $\chi(2)$ process (also chi(2) process) and/or a $\chi(3)$ process (also chi(3) process) and/or a Raman effect, such as a Self Soliton Raman Shift, to laser light traversing the at least one optical element. In particular, Raman processes as described in DE 10 2006 023 601 A1 could be used. Involved $\chi(2)$ processes could be one or more of frequency doubling, sum and difference frequency generation or parametric amplification, for example. Involved $\chi(3)$ processes could be one or more of self phase modulation and four wave mixing, for example.

Alternatively or additionally, the at least one optical element provided in the at least one branch light path could be configured to amplify laser light traversing the at least one optical element. Also, the at least one optical element can comprise one or more optical elements, such as an optical fiber, for guiding the light from the common light path to an application supplied with light from the at least one branch light path. Such optical transmission lines may have relatively short lengths or may even have lengths of at least 1 m, at least 10 m or at least 100 m, for example for providing a fiber connection between different labs.

Preferably the frequency comb light is generated by a mode locked laser. Other embodiments might use other optical frequency comb sources, like micro resonator based comb sources (Nature Photonics Vol. 13, pp. 158-169 (2019)), EOM based comb sources (Optics Letters Vol. 33, Issue 11, pp. 1192-1194 (2008)) and DFG comb sources (as described e.g. in U.S. Pat. No. 6,724,788 B1). Preferably the combs are stabilized to high accuracy references (optical or RF).

Preferably, the optical frequency comb source is in itself stabilized with respect to the offset frequency $f_0$ and/or the repetition frequency $f_{rep}$ of the frequency comb. This ensures that the light introduced into the common light path by the frequency comb source already has high frequency stability. Preferably, stabilization of the offset frequency $f_0$ and the repetition frequency $f_{rep}$ of the frequency comb is part of the optical frequency source itself and is not entangled with the phase correction for the laser light from the at least one branch light path. A standard stabilized frequency comb source can be used with the present invention.

According to an embodiment, the at least one branch light path can be fully or partially provided in an environmentally shielded box to reduce destabilizing effects from environmental changes. In particular, the environmentally shielded box could stabilize the at least one branch light path with respect to temperature.

The current invention is most useful for frequency combs of high stability and accuracy. In a preferred embodiment the frequency comb has a stability as measured in terms of the Allan deviation of $10^{-13}$ at 1 sec or better. Other preferred embodiments have a stability of $10^{-16}$ at 1 sec or even $10^{-18}$ in 1 sec.

The accuracy of such frequency combs in a preferred embodiment is $10^{-18}$ or better.

According to an embodiment, the phase correction can comprise modifying the optical properties of the at least one branch light path by operating one or more actuators according to a control scheme, in particular one or more via phase locked loops. This enables carrying out real-time phase correction in the branch light path, and phase corrected laser light is provided at the output of the branch light path.

A closed feedback loop can be established by modifying the optical properties (especially the group and/or phase delay) in the at least one branch light path upstream of the measurement point using one or more actuators. As an alternative, it is also conceivable that the phase correction comprises a feed forward scheme. This can, for example, be implemented by modifying the optical properties in the at least one branch light path downstream of the measurement point using one or more actuators.

The actuators may comprise, for example, a temperature modification assembly, a fiber squeezer, a fiber stretcher (for example embodied as a piezo drum), a free space optical path section having adjustable length, an electro-optic device, an acousto-optic device or combinations thereof.

According to another embodiment, the phase correction for the laser light from the at least one branch light path can comprise post processing of data. In this case, it is not necessary to drive actuators based on the determined phase differences. For example, a time evolution of the phase difference acquired for the at least one branch light path could be recorded and taken into account when evaluating data obtained in a specific application based on the laser light provided at the output of the at least one branch light path.

Preferentially, for the at least one branch light path, a second frequency mode $v_2$ different from the first frequency mode $v_1$ is used for an application supplied with light by the branch light path. Such frequency mode that is different from the first frequency mode $v_1$ can, for example, be generated by the at least one optical element of the branch light path. In case of multiple branch light paths, it is possible to use the same first frequency mode $v_1$ for the phase stabilization of all branch light paths, although the branch light paths supply applications using different second frequency modes $v_2$.

The application supplied with light by the at least one branch light path may use the light from the at least one branch light path for various purposes. For example, the application may use the light for generating a beat signal, for example in order to compare two clock lasers.

Detecting the difference in phase between the light coupled out at the reference point and the light coupled out at the measurement point at a frequency (first frequency mode $v_1$) that is different from the frequency used in the application (second frequency mode $v_2$) is a specific idea according to an embodiment of the invention, which is referred to as "dichroic detection" by the inventors.

Preferably, the phase correction comprises a frequency-transformation step such that the phase correction provides correction, in particular optimal correction, at the second frequency mode $v_2$ used by the application, although the phase correction uses the phase difference that was determined at the first frequency mode $v_1$. In a simple version, the detected phase difference $\delta\phi_1$ at the first frequency mode $v_1$ can be used in the frequency-transformation step to estimate the phase difference $\delta\phi_2$ at the second frequency mode $v_2$, for example according to the linear relation $\delta\phi_2=\delta\phi_1*v_2/v_1$.

Although the concept of dichroic detection may be used in this simple form, it can be further improved by using a more sophisticated version of the frequency-transformation step. Group delay and phase delay are not generally equal in different media (except vacuum), nor are potential variations thereof. This means that the linear relation $\delta\phi_2=\delta\phi_1*v_2/v_1$ may be inaccurate. To better understand this, the following general physical considerations may be helpful.

Let us consider a piece of fiber (which, for example, might be part of a branch light path of the optical frequency comb assembly of the invention or might be an optical component thereof) with length L which expands. For the example, we assume that measuring a phase difference between the ends of the fiber with CW laser light at 1.5 µm wavelength (or 200 THz of optical frequency) yields that the optical fiber length expands at a rate of 1 cycle (2 Pi) (referring to the wavelength of the light used for the measurement) per second. This corresponds to an expanding optical path length of 1.5 µm per second. For reference, typical glass fibers have a thermal expansion coefficient for the optical path of approx. 10^-5/K, meaning that for a 1.5 m piece of fiber a temperature change of 0.1 K per second would be necessary to achieve such a drift rate. In the above situation, the frequency of the CW light at 200 THZ would have changes by 1 Hz or 0.5×10^-14 after having run through the fiber. This effect is referred to as Doppler shift. Therefore it is easy to see that a relatively small temperature change can introduce a large frequency shift.

If the same measurement is done with CW light at 1 µm (300 THz), the first approximation will lead us to the assumption that 1.5 cycles (3 Pi) of 1 µm light will fit into the additional 1.5 µm optical path length. Therefore we apply a scaling factor that is proportional to the frequency difference of 300 THz/200 THz=1.5/1 to the optical cycles or to the optical path length.

Unfortunately this is not entirely correct. Since group and phase delay will in general not change in the same way, a pulse train (resembling a frequency comb with mode spacing $f_{rep}$) will see a different optical path length change for different frequency components. Let's assume for now that the change of group delay is larger than the change of phase delay (normal dispersion regime). This means that the pulse train will see a larger optical path length change for the 1 µm component. If we now use the comb to measure the distance to the 300 THz laser, we find that the frequency at 300 THz appears shifted slightly more than 1.5 Hz. This effect and therefore the associated correction has been measured to be approximately of the order of a few percent.

Such effects can be taken into account to one or several orders according to embodiments of the invention. To first order, the effect can be accounted for by introducing a fix point frequency $v_{fix}$, leading to the relationship $\delta\phi_2=\delta\phi_1*(v_2-v_{fix})/(v_1-v_{fix})$, which can be used in the more sophisticated frequency-transformation step according to an embodiment. Unfortunately, for the branch light path and/or the optical elements provided therein, in particular for most commercial fibers, dispersion properties are not well enough known to predict the fix-point frequency $v_{fix}$.

To implement an improved frequency-transformation step in the phase correction, the method may further comprise carrying out a reference measurement characterizing the relationship between a frequency of laser light running through the at least one branch light path and a phase difference between a portion of the laser light coupled out at the reference point and another portion of the laser light coupled out at the measurement point. Using this reference measurement, the fix point frequency $v_{fix}$ can be determined and the phase correction can be optimized with improved accuracy at a desired frequency mode different from the first frequency mode $v_1$, in particular at the second frequency mode $v_2$. It should be noted that it is, however, not necessary to actually calculate $v_{fix}$ based on the results of the reference measurement. It can be sufficient, if the measurement would allow calculating $v_{fix}$. There are various ways of implementing an exact calculation used in the improved frequency-transformation step based on the results of the reference measurement.

The reference measurement may comprise measuring a phase delay at two different frequencies $v_{ref, A}$, $v_{ref, B}$ for laser light running through the at least one branch light path. In particular, this may comprise measuring a difference between a portion of the laser light coupled out at the reference point and another portion of the laser light coupled out at the measurement point at the two different frequencies $v_{ref, A}$, $v_{ref, B}$ for the laser light running through the at least one branch light path. Alternatively, the reference measurement may comprise measuring the group delay and phase delay at one frequency $v_{ref, A}$ for laser light running through the at least one branch light path. Using this reference measurement, the fix point frequency $v_{fix}$ can be determined (but, as stated above, does not have to be explicitly determined) and the phase correction can be optimized with improved accuracy at a desired frequency mode different from the first frequency mode $v_1$, in particular at the second frequency mode $v_2$.

According to an embodiment, the reference measurement can be conducted before or at the beginning of an operation of the optical frequency comb assembly. The results of that reference measurement could be used during the operation of the frequency comb assembly without further adjustment during operation. Of course, this should not exclude the possibility of running a calibration measurement for obtaining an up-to-date value, in particular an up-to-date value for the fix point frequency $v_{fix}$, in a reference measurement from time to time or between uses of the assembly.

The frequency transformation step, in particular the fix point frequency $v_{fix}$, may depend on time, in particular due to changing nature of a perturbation such as variation of different environmental parameters like temperature and humidity, but also mechanical stress on fibers. Therefore, the reference measurement, according to an alternative embodiment, can also be done in a continuous or semi-continuous fashion or cyclically during operation of the frequency comb assembly to update the frequency-transformation step during operation of the frequency comb, to even further improve accuracy.

For carrying out the reference measurement, continuous wave (CW) laser light may be used according to an embodiment. This is in particular advantageous, if the reference measurement is carried out before the assembly is provided to a customer. However, the reference measurement may also be carried out using light from the frequency comb source of assembly itself or from an external frequency comb source. This is particularly advantageous, if the frequency-transformation step is updated during operation of the frequency comb assembly. If light from the frequency comb source is used for the reference measurement, the reference measurement may be conducted at frequencies $v_{ref,\,A}$, $v_{ref,\,B}$ corresponding to frequency modes of the frequency comb. In particular one of $v_{ref,\,A}$ and $v_{ref,\,B}$ may correspond to the first frequency mode $v_1$ or the second frequency mode $v_2$.

Generally speaking, providing the phase correction for the laser light from the at least one branch light path may comprise the frequency-transformation step being based on the reference measurement and accounting for the second frequency mode $v_2$ being different from the first frequency mode $v_1$ to obtain light output from the at least one branch light path having the second frequency mode $v_2$ stabilized.

The invention also pertains to an optical frequency comb assembly. The optical frequency comb assembly comprises a common light path, an optical frequency comb source configured to generate laser light constituting an optical frequency comb and introducing the laser light into the common light path, and at least one branch light path seeded by the laser light from the common light path, the at least one branch light path comprising at least one optical element. The optical frequency comb assembly further comprises a phase measurement assembly configured to determine a phase difference of a first frequency mode $v_1$ of the optical frequency comb between laser light coupled out at a reference point within the frequency comb assembly upstream of the at least one optical element and laser light coupled out at a measurement point provided in the at least one branch light path downstream of the at least one optical element. Further, the optical frequency comb assembly comprises a control unit configured to provide phase correction for the laser light from the at least one branch light path based on a deviation of the determined phase difference from a target value.

The optical frequency comb assembly is configured and adapted to carry out the method according to the invention and/or to be used with the method. Any features described with respect to the method can be transferred to the optical frequency comb assembly and vice versa.

In the following, the invention will be further described by describing embodiments with reference to the figures.

Figure 5:
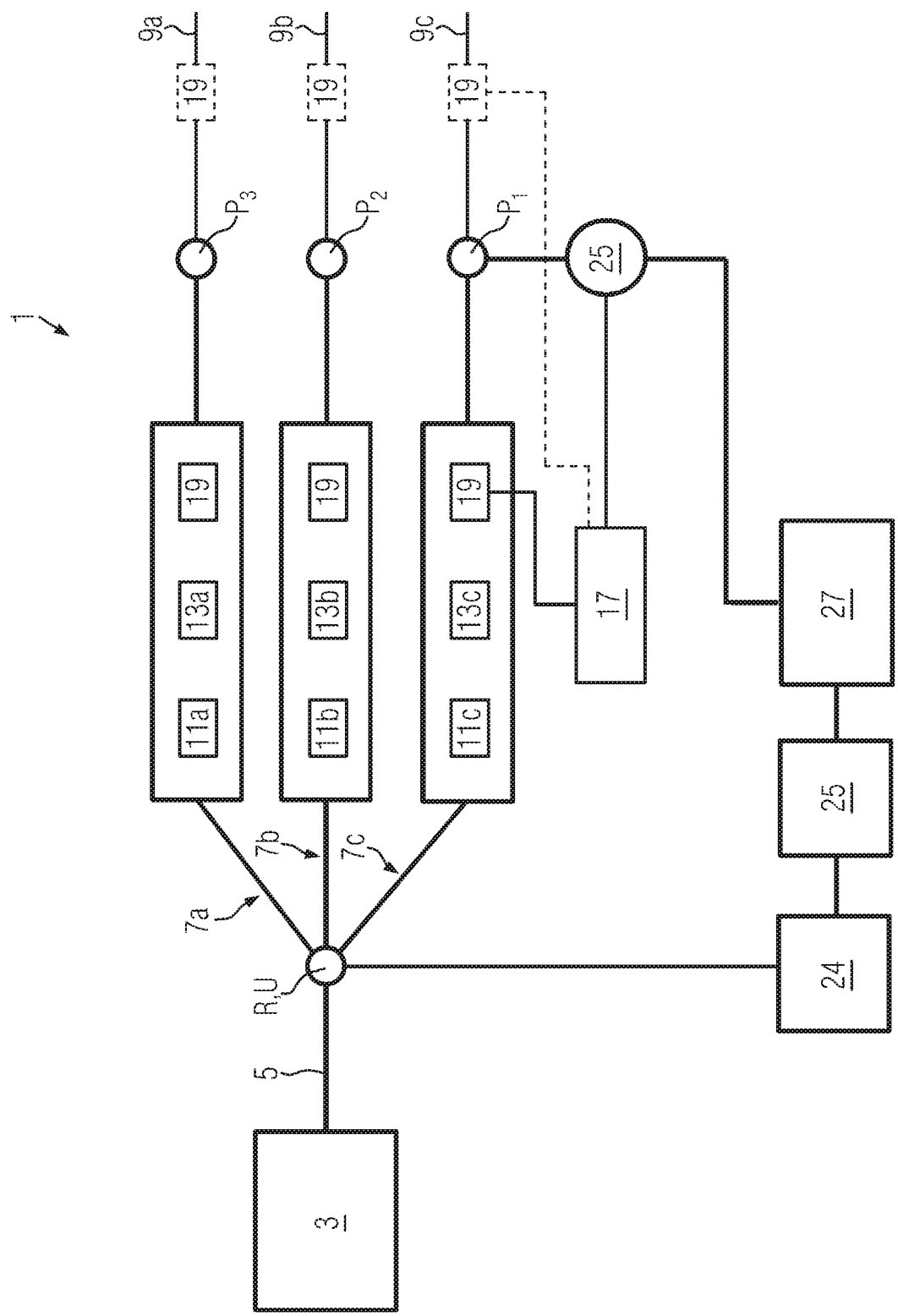
Figure 6:
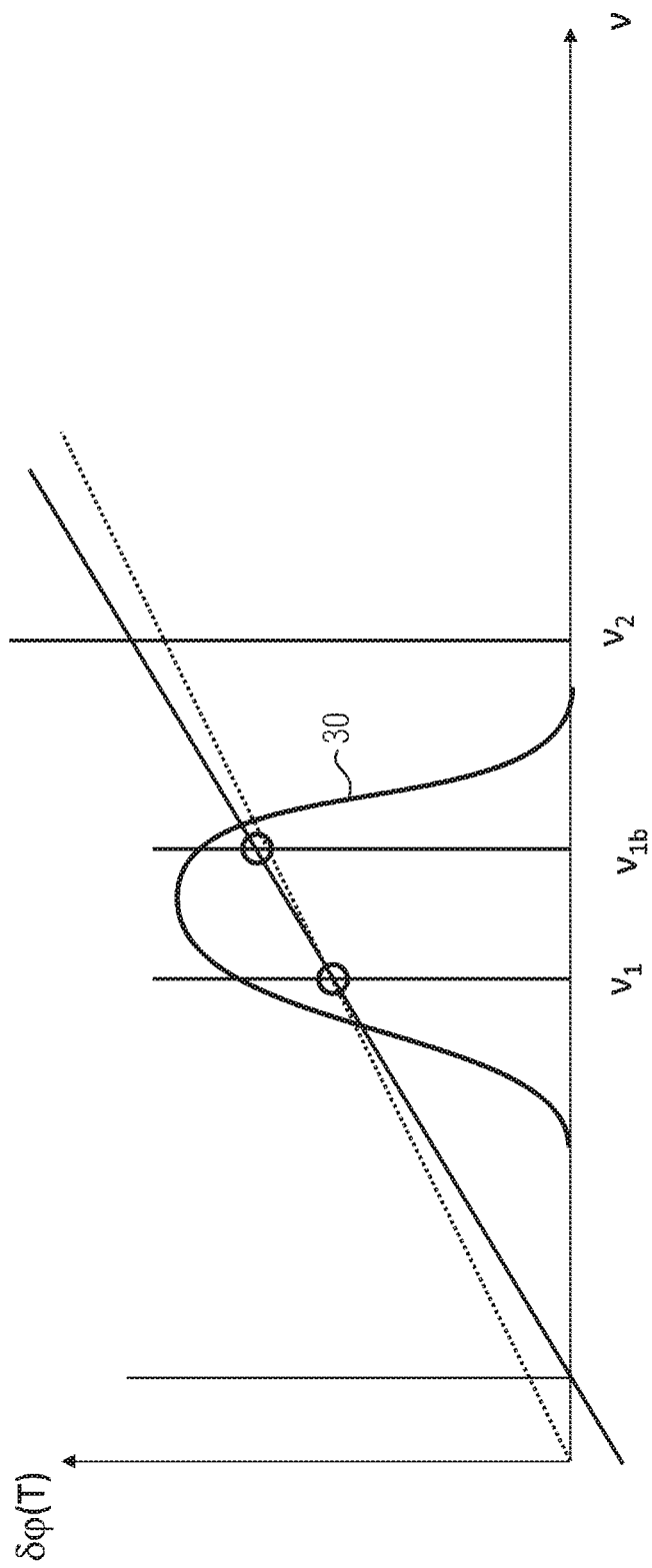

FIG. 5 shows a schematic block diagram illustrating the method for operating an optical frequency comb assembly according to another embodiment with the reference light being derived from the optical frequency comb source; and FIG. 6 is a schematic illustration of relations between a frequency of light traversing a branch light path and a phase shift picked up by the light in the branch light path according to different models used for describing an embodiment of the invention.

Figure 1:
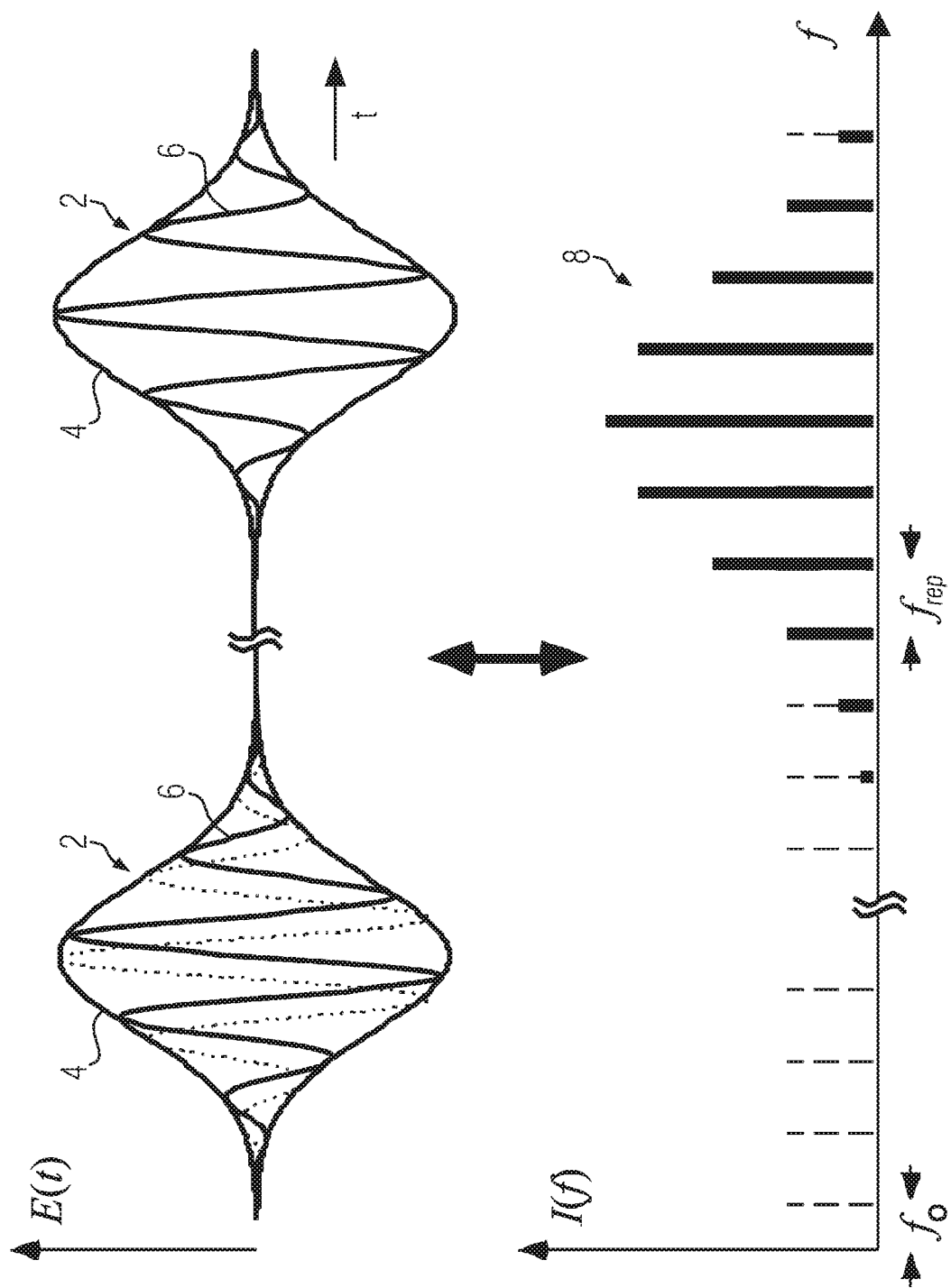
FIG. 1 shows a schematic representation illustrating the concept of a frequency comb.

The present invention relates to laser light constituting an optical frequency comb. The upper part of FIG. 1 shows laser pulses 2 in a representation of the electric field against time. Both the envelope 4 of laser pulses 2 as well as the carrier wave 6 of laser pulses 2 are shown. The carrier wave 6 is represented by a sinusoidal oscillation in the range of optical frequencies.

The lower part of FIG. 1 shows the optical frequency comb 8 associated with laser pulses 2 from the upper part of FIG. 1 in a representation of the intensity against the frequency. The frequency comb 8 has a plurality of laser modes, the frequencies of which can be described by the formula $f_m = m \times f_{rep} + f_0$, with $f_{rep}$ (repetition frequency) being a distance of neighboring modes in the frequency domain, m being a natural number and $f_0$ being referred to as the offset frequency, in particular the carrier-envelope offset frequency, of the frequency comb 8. The modes of a real frequency comb 8, of course, extend over a finite width in the frequency domain.

Figure 2:
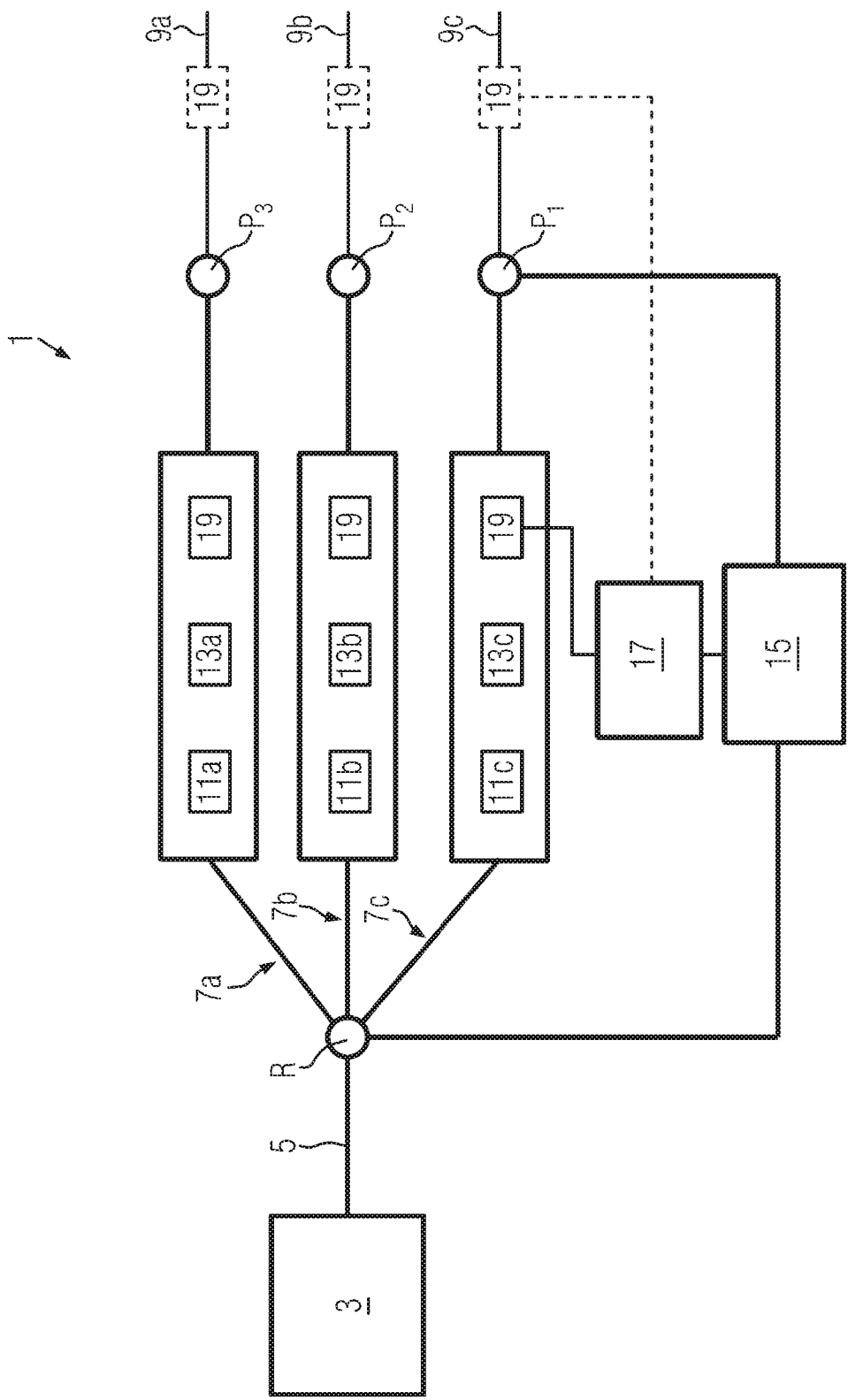
FIG. 2 shows a schematic block diagram illustrating the method for operating an optical frequency comb assembly according to an embodiment.

FIG. 2 is a schematic block diagram illustrating the working principle of the present invention. The diagram illustrates an optical frequency comb assembly 1 having an optical frequency comb source 3 that generates laser light constituting an optical frequency comb 8. The frequency comb 8 may, for example be a comb generated by fs lasers (fiber lasers, solid-state lasers, etc.), a Hz linewidth comb, a DFG comb, an electro-optic comb, a micro-resonator based comb, a comb based on photonic integrated circuits, etc. Preferably, the frequency source 3 is in itself stabilized with respect to the offset frequency $f_0$ and/or the repetition frequency $f_{rep}$ of the frequency comb 8. In particular, the optical frequency comb source 3 can be a fiber laser with a fiber-coupled output port and an amplifier, such as the Menlo Systems FC 1500 system (250 MHz repetition rate, NOLM-based laser). In a preferred embodiment, a NOLM-based laser with fast actuators for locking the two degrees of freedom as described in DE 10 2014 226 973 A1 (incorporated herein by reference in its entirety) is used. The NOLM-based laser in itself is already known to be low noise. With fast actuators, this noise can be even further reduced.

The laser light generated by the optical frequency comb source 3 is introduced into a common light path 5. The common light path 5 branches into a plurality (three in the illustrated embodiment) of branch light paths 7 (7a, 7b, 7c) supplied by the laser light from the common light path 5. It would, however, also be sufficient, if only one branch light path 7 was provided and supplied with light from the common light path 5. In the illustrated embodiment, the branch light paths 7 branch off from the common light path 5 at a common branching point, which, for example, may be defined by a fiber splitter. The branch light paths 7 comprise respective outputs 9 (9a, 9b, 9c), which can supply laser light to one or more applications.

To specifically tailor the laser light to meet the requirements of the corresponding application, each of the branch light paths 7 comprises an amplifier 11 (11a, 11b, 11c) and a nonlinear element 13 (13a, 13b, 13c). The nonlinear elements 13 are configured to modify a frequency spectrum of the laser light going through the respective branch light paths 7 as needed for a corresponding application. The nonlinear elements 13 may have different configurations for the individual branch light paths 7.

More generally, at least one optical element 11, 13 may be provided in each branch light path 7. The at least one optical element 11, 13 could be configured to induce a $\chi(2)$ process and/or a $\chi(3)$ process to laser light traversing the at least one optical element 11, 13. Alternatively or additionally, the at least one optical element 11, 13 provided in each branch light path 7 could be configured to amplify laser light traversing the at least one optical element 11, 13. This can, for example, allow tailoring the output of the branch light path 7 to the specific needs of a user. The at least one optical element 11, 13 could also be configured to induce a Raman Gain, such as a Self Soliton Raman Shift, or a Brillouin gain to laser light traversing the at least one optical element 11, 13. In particular, the at least one optical element 11, 13 can comprise a nonlinear frequency broadener. This allows generating modes for use in an application supplied by the branch light path 7. Additionally or alternatively, the at least one optical element 11, 13 could comprise the amplifier 11.

The nonlinear elements 13, the amplifiers 11 and/or other optical elements of the branch light paths 7 may have nonlinear optical properties. Due to the nonlinear optical properties of specific elements provided in the branch light paths 7 and other effects, such as variations in the length of the optical path traversed by light running through the branch light path 7, phase instabilities may be introduced when the laser light traverses the branch light paths 7. The path traversed by light running through the at least one branch light path 7, in particular through the at least one optical element 11, 13 of the branch light path 7, can be subject to variations, such as environmental variations. For example, acoustic noise, temperature variations and mechanical vibrations can be especially detrimental. They all can severely disturb the light path and cause phase variations in the light that travels in the at least one branch light path 7. Since frequency is the time derivative of phase, a disturbed phase of an ideal frequency comb results in a frequency comb where the modes are frequency shifted from the original position. This effect can be at least partially corrected for according to the invention.

FIG. 2 schematically shows a phase measurement assembly 15 for measuring a phase difference of a first frequency mode $v_1$ of the optical frequency comb 8 between laser light coupled out at a reference point R provided in the optical frequency comb assembly 1 upstream of the optical elements 11, 13 of the branch light paths 7 and laser light coupled out at a measurement point $P_1$ provided in branch light path 7c downstream of the optical elements 11, 13. Details of the phase measurement assembly 15 will be described below. For ease of illustration, FIG. 2 only shows the phase measurement assembly 15 corresponding to the branch light path 7c. However, in an analogous manner, additional phase measurement assemblies 15 are provided for measuring phase differences between laser light coupled out at a reference point R and laser light coupled out at measurement points P2, P3 of the remaining branch light paths 7b, 7a.

Using the determined phase differences between the laser light coupled out at the reference point R and the laser light coupled out at the measurement point P for each of the branch light paths 7, respectively, a phase correction is provided for the laser light from each of the branch light paths 7. As shown in FIG. 2, the phase measurement assembly 15 corresponding to a specific branch light path 7 provides the determined phase difference at the first frequency mode $v_1$ to a control unit 17. The control unit 17 determines and optionally also carries out a phase correction for the laser light from each of the branch light paths 7, respectively, based on a deviation of the determined phase difference for the respective branch light path 7 from a target value. The target value may be a predetermined value or may be automatically or manually determined during operation of the optical frequency comb assembly 1. Further, the target value may be the same or may not be the same for all branch light paths 7.

The phase correction can compensate for time-dependent phase instabilities which, due to the frequency being the time derivative of phase, would lead to frequency shift in the comb light traversing the respective branch light path 7.

In particular, the phase difference can be determined continuously or semi-continuously, for example cyclically, to be able to appropriately monitor the time evolution of the phase and take same into account for the phase correction to provide time-dependent phase correction.

In the illustrated embodiment, the control unit 17 carries out a phase correction of light from a branch light path 7 by operating an actuator 19 disposed in the branch light path 7 based on the determined phase difference for the respective branch light path 7 to appropriately modify the optical properties of the branch light path 7. It would also be conceivable that more than one actuator 19 operated by the control unit 17 is provided in one or some of the branch light paths 7. For example, a temperature modification assembly, a fiber squeezer, a fiber stretcher which may be embodied as a piezo drum, an actuator for adjusting the length for a free-space optical path section, an electro-optic device, an acousto-optic device or combinations thereof may be used as actuators 19. In particular, two or more actuators 19 of different nature could be used to simultaneously provide phase correction according to two phase differences determined for light at two different frequency modes, such as the first frequency mode $v_1$ and another mode $v_{1b}$ of the frequency comb 8, respectively.

The control unit 17 may carry out the phase correction according to a closed control loop, such as a phase locked loop. In this case, the actuator 19 may be provided upstream of the measurement point P of the corresponding branch light path 7 (shown in continuous lines in FIG. 2). However, as an alternative, the actuator 19 could also be provided downstream of the respective measurement point P, as illustrated in dashed lines in FIG. 2. Then, the control scheme for carrying out the phase correction corresponds to a feed-forward scheme. Alternatively, it would also be conceivable to carry out phase correction by post processing of the data obtained by the application supplied with light by the branch light path 7, without having the actuator 19.

Figure 3:
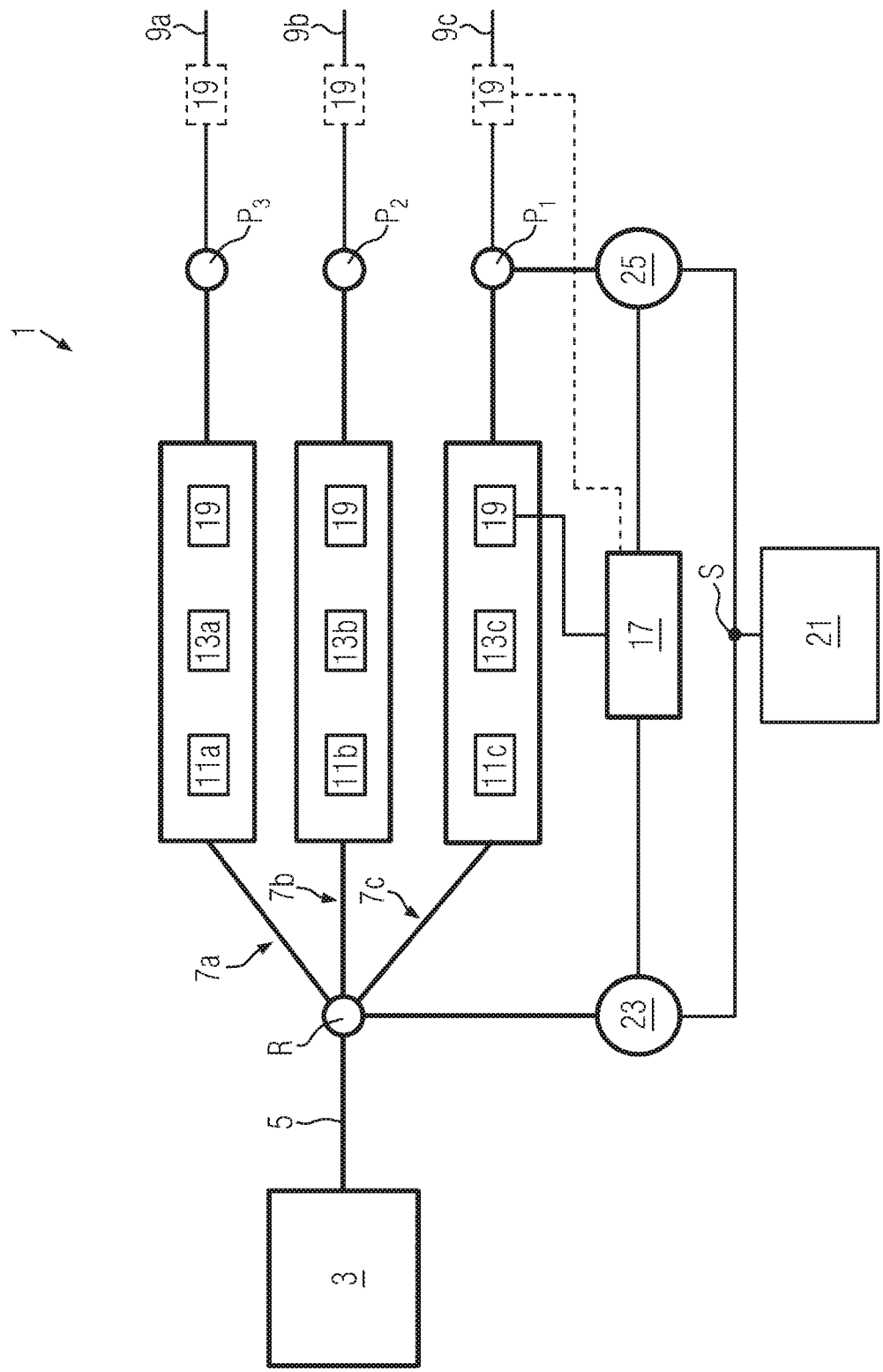
FIG. 3 shows a schematic block diagram illustrating the method for operating an optical frequency comb assembly according to an embodiment with a CW laser as reference light source.
Figure 4:
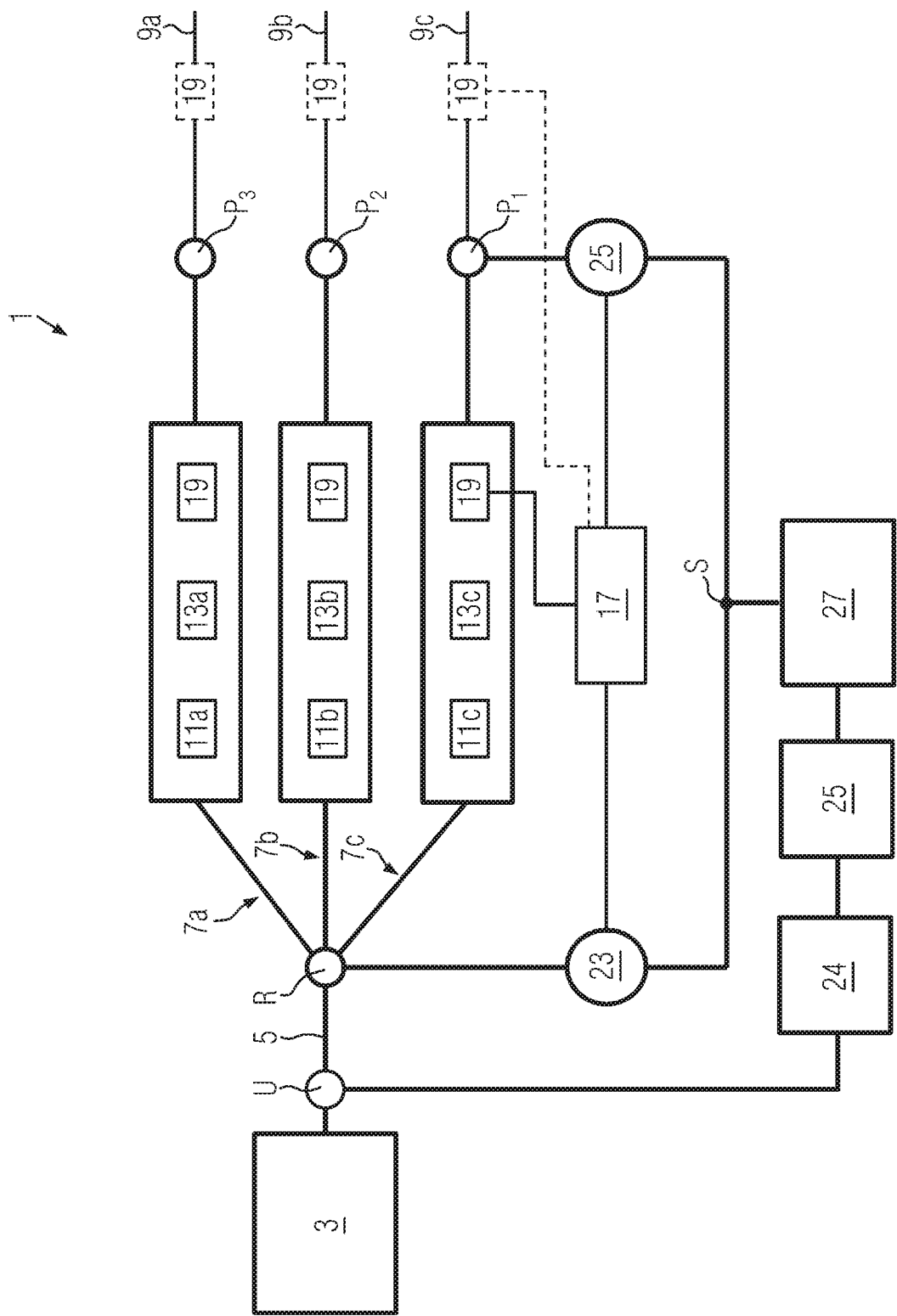
FIG. 4 shows a schematic block diagram illustrating the method for operating an optical frequency comb assembly according to an embodiment with the reference light being derived from the optical frequency comb source.

FIGS. 3 to 5 illustrate details of the phase measurement assembly 15 according to embodiments.

According to the embodiments illustrated in FIGS. 3 and 4, determining the phase difference at the first frequency mode $v_1$ between the reference point R and the respective measurement point P of a branch light path 7 comprises measuring a beat signal between reference light and laser light branched off at the reference point R and a beat signal between the reference light and laser light branched off at the measurement point P.

According to the embodiment shown in FIG. 3, the reference light used in the beat measurements is continuous laser light provided by a highly stable continuous wave (CW) laser 21. The beat signal between the light branched off at the reference point P and the reference light from the continuous wave laser 21 is measured at a first photodiode 23, at which the light branched off at the reference point P is brought to overlap with the reference light from the continuous wave laser 21. The beat signal between the laser light branched off at the measurement point P and the reference light is measured at a second photodiode 25, at which the light branched off at the measurement point P is brought to overlap with the reference light from the continuous wave laser 21. According to an embodiment, the light from the highly stable CW laser 21 may be split at a common splitting point S and guided to the photodiodes 23, 25. Signals from the photodiodes 23, 25 are provided to the control unit 17 which based on the beat signals drives the actuators 19 accordingly to carry out phase correction.

FIG. 4 shows an alternative embodiment, according to which the reference light provided to the photodiodes 23, 25 is not provided by a continuous wave laser 21, but is derived from the optical frequency comb 8 provided by the optical frequency comb source 3. The laser light is split from the common light path 5 at point U and filtered by a frequency filter 24 to one or a few modes. Optionally, the reference light can also be amplified by an amplifier 25. The laser light is then frequency shifted by a frequency shifter 27, for example an acousto-optic modulator or an electro-optic modulator, to obtain a mode that is slightly different from the first frequency mode $v_1$ at which the phase difference is determined. The resulting reference light is then supplied to the photodiodes 23, 25 and beat signals with light branched off at the reference point R or the measurement point P, respectively, are measured and provided to the control unit 17 as described with respect to FIG. 3. Deriving the reference light from the light provided by the frequency comb source 3 has the advantage that it is not required to provide an additional source for the reference light, such as the continuous wave laser 21. However, as the light provided by the reference comb source 3 is pulsed laser light, it has to be ensured that the pulses arriving at the photodiodes 23, 25 from the reference point R and the measurement point P are synchronized with the pulses of the reference light. In such embodiment, a multitude (typically few hundreds) of comb lines around the center value $v_1$ may contribute to the beat signal, and the phase of the derived radio-frequency signal will be an average phase of all contributing modes.

In the illustrated embodiments, the reference point R is the same for each of the branch light paths 7. This has the advantage that the beat signal between the light branched off at the reference point R and the reference light does not have to be measured separately for each branch light path 7. Rather, one measurement of the beat signal between the laser light at the reference point R and the reference light can be carried out and used for determining the phase differences between the laser light at the reference point R and the laser light at the measurement point P of each of the branch light paths 7, respectively.

In the figures, the reference point R is indicated as lying at a point where all the branch light paths 7 branch off from the common light path 5. Such implementation is convenient, as the laser light to be guided to the first photodiode 23 can be derived from an additional output of a splitter provided for splitting the common light path 5 into the branch light paths 7. However, the reference point R could also be provided at another position in the common light path 5 or even in one of the branch light paths 7 (upstream of the nonlinear optical elements 11, 13).

FIG. 5 shows an embodiment that is related to the embodiment of FIG. 4. Again, the reference light is derived from the optical frequency comb 8 provided by the optical frequency comb source 3. As shown in FIG. 5, it may be sufficient to only measure the beat signal between the reference light and the laser light coupled out at the measurement point P. It is not absolutely necessary to also measure the beat signal between the reference light and the laser light coupled out at the reference point R. The laser light is split from the common light path 5 at point U and filtered by a frequency filter 24 to one or a few modes. Optionally, the reference light can also be amplified by an amplifier 25. The laser light is then frequency shifted by a frequency shifter 27, for example an acousto-optic modulator or an electro-optic modulator, to obtain a mode that is slightly different from the first frequency mode $v_1$ at which the phase difference is determined. The resulting reference light is then supplied to the photodiode 25 and a beat signal with light branched off at the measurement point P is measured and provided to the control unit 17. The photodiode 23 shown in FIG. 4 is not provided in the embodiment of FIG. 5. As the reference light used for measuring the beat signal between the reference light and the laser light coupled out at the measurement point P already contains information (phase information) from the frequency comb 8 supplied to the common light path 5 by the optical frequency comb source 3, measuring only the one beat signal allows determining the phase difference between light coupled out at the reference point R and the light coupled out at the measurement point P with sufficient accuracy. To increase accuracy, it is advantageous to couple out light used as the reference light from the common light path 5 near or at the reference point R (meaning that point U and reference point R are the same or near to each other). In particular, the point U at which light to serve as reference light is coupled out can also define the reference point R.

As stated above, the nonlinear elements 13 of the branch light paths 7 may provide frequency modes to be used by an application supplied with light by the respective branch light path 7. That frequency mode may not be present at the reference point R. Therefore, that frequency may not be used as the first frequency mode $v_1$ at which the phase difference between the laser light coupled out at the reference point R and the laser light coupled out at the measurement point P of the respective branch light path 7 is determined. For one or more branch light paths 7, a second frequency mode $v_2$ used by an application supplied with light from the branch light path 7 may be different from the first frequency mode $v_1$.

Preferably, the phase correction comprises a frequency-transformation step such that the phase correction provides optimal correction at the second frequency mode $v_2$ used by the application, although the phase correction uses the phase difference that was determined at the first frequency mode $v_1$. In a simple version, the detected phase difference $\delta\phi_1$ at frequency $v_1$ can be used in the frequency-transformation step to estimate the phase difference $\delta\phi_2$ at the second frequency $v_2$ according to the linear relation $\delta\phi_2=\delta\phi_1*v_2/v_1$. This linear relation would correspond to the dotted line shown in the diagram of FIG. 6 which shows the relation between a frequency $v$ of light traversing a branch light path 7 and the phase shift $\delta\phi(T)$ picked up by the light in the branch light path 7. According to the linear relation shown by the dotted line, the phase difference has a frequency dependence without dispersive character.

However, as group delay and phase delay or variations thereof are not generally equal in different media (except vacuum), the linear relation $\delta\phi_2=\delta\phi_1*v_2/v_1$ may be inaccurate, in particular, if the second frequency mode $v_2$ is far away from the first frequency mode $v_1$. In particular, the branch light path 7 may have normal dispersion properties, meaning that the phase delay is larger for small frequencies than for large frequencies. Although the concept of dichroic detection may be used with the described simple form of the frequency-transformation step, it can be further improved by using a more sophisticated version of the frequency-transformation step by introducing a fix point frequency $v_{fix}$, leading to the relationship $\delta\phi_2=\delta\phi_1*(v_2-v_{fix})/(v_1-v_{fix})$, which can be used in the frequency-transformation step. The more accurate relation taking into account the fix point frequency $v_{fix}$ corresponds to the continuous line in FIG. 6 showing the relation between a frequency $v$ of light traversing a branch light path 7 and the phase shift $\delta\phi$ (T) picked up by the light in the branch light path 7 for a branch light path 7 having normal dispersion. This is more accurate.

Unfortunately, for the branch light path 7 and/or the optical elements 11, 13 provided therein, in particular for most commercial fibers, dispersion properties are not well enough known to predict the fix-point frequency $v_{fix}$.

To implement the improved frequency-transformation step in the phase correction, the method may further comprise carrying out a reference measurement characterizing the relationship between a frequency of laser light running through the respective branch light path 7 and a phase difference between a portion of the laser light coupled out at the reference point R and another portion of the laser light coupled out at the respective measurement point P. Using this reference measurement, the fix point frequency $v_{fix}$ can be determined and the phase correction can be optimized with high accuracy at a desired frequency mode different from the first frequency mode $v_1$, in particular at the second frequency mode $v_2$. Although the results of the reference measurement allow calculating the fix point frequency $v_{fix}$, an explicit calculation of the fix point frequency $v_{fix}$ is not necessary according to some embodiments.

In an embodiment, the reference measurement can comprise measuring a phase difference between a portion of the laser light coupled out at the reference point R and another portion of the laser light coupled out at the measurement point P at two different frequencies to provide an improved frequency-transformation step and to allow determining the fix point frequency $v_{fix}$. In particular, the reference measurement can comprise the determination of a phase difference between a portion of the laser light coupled out at the reference point R and another portion of the laser light coupled out at the measurement point P at two distinct frequency modes $v_{ref,\,A}$, $v_{ref,\,B}$ of the frequency comb 8, which in particular can correspond to the first frequency mode $v_1$ and a reference frequency mode $v_{1b}$. In preferred embodiments, the relative difference between the frequencies $v_{ref,\,A}$, $v_{ref,\,B}$ is larger than 0.5%, more preferably larger than 2%, and even more preferably larger than 5%.

Providing the phase correction for the laser light coupled out from the branch light path 7 may comprise the frequency-transformation step being based on the reference measurement and accounting for the second frequency mode $v_2$ being different from the first frequency mode $v_1$ to obtain light output from the branch light path 7 having the second frequency mode $v_2$ stabilized.

According to an embodiment, the reference measurement can be conducted before or at the beginning of an operation of the optical frequency comb assembly 1. The fix point frequency $v_{fix}$ could be determined according to that reference measurement and be used during the operation of the frequency comb assembly 1 without further adjustment during operation.

The fix point frequency $v_{fix}$ may depend on time, especially through time varying environmental parameters like temperature and humidity, but also mechanical stress on fibers can be a cause. Therefore, the reference measurement, according to an alternative embodiment, can be done in a continuous fashion during operation by using two frequency modes of light in the branch light path, in particular the first frequency mode $v_1$ and a reference frequency mode $v_{1b}$.

FIG. 6 explains the physical situation underlying the frequency-correction step. The graph displays the phase delay ☐☐(T) for light travelling in the path 7 at some chosen time T as a function of the frequency of the light. It is assumed that at the frequency v1, the phase delay is determined according to the invention. The dotted line represents a linear estimate of the phase delay as a function of frequency, corresponding to a phase delay with no dispersive character. The straight line corresponds to a model that takes into account the dispersive character of the phase delay, here chosen to be normally dispersive. This second line traverses the y-axis at the fix-point frequency $v_{fix}$ and predicts the phase shift at a second frequency $v_2$ in a better way. The graph also indicates a second frequency $v_{1b}$ inside the range of the original frequency comb spectrum 30 which may be used to infer the slope of the model and/or the fix point frequency according to an embodiment of the invention.

The invention claimed is:

1. Method for operating an optical frequency comb assembly, the method comprising:
    operating an optical frequency comb source to generate laser light constituting an optical frequency comb and introducing the laser light into a common light path;
    seeding at least one branch light path by the laser light from the common light path, the at least one branch light path comprising at least one optical element;
    determining a phase difference of a first frequency mode $v_1$ of the optical frequency comb between laser light coupled out at a reference point within the frequency comb assembly upstream of the at least one optical element and laser light coupled out at a measurement point provided in the at least one branch light path downstream of the at least one optical element; and
    providing phase correction for the laser light from the at least one branch light path based on a deviation of the determined phase difference from a target value.

2. Method according to claim 1, wherein the reference point is the same for the determinations of the phase difference for multiple branch light paths.

3. Method according to claim 1, wherein determining the phase difference of the first frequency mode $v_1$ between the laser light coupled out at the reference point and the laser light coupled out at the measurement point comprises measuring a beat signal between reference light and the laser light coupled out at the reference point and/or a beat signal between the reference light and the laser light coupled out at the measurement point.

4. Method according to claim 3, wherein the reference light is continuous wave laser light.

5. Method according to claim 3, wherein the reference light is derived from the optical frequency comb provided by the optical frequency comb source to the common light path, the reference light in particular being generated by submitting the laser light to a frequency shifter and optionally carrying out frequency filtering of the laser light from the common light path.

6. Method according to claim 1, wherein the at least one optical element is configured to induce a $\chi(2)$ process and/or a $\chi(3)$ process to laser light traversing the at least one optical element and/or to amplify laser light traversing the at least one optical element.

7. Method according to claim 6, wherein the at least one optical element comprises a nonlinear frequency broadener.

8. Method according to claim 1, wherein the optical frequency comb source is in itself stabilized with respect to the offset frequency $f_0$ and/or the repetition frequency $f_{rep}$ of the frequency comb.

9. Method according to claim 1, wherein the phase correction comprises modifying the optical properties of the at least one branch light path by operating at least one actuator.

10. Method according to claim 9, wherein the phase correction comprises modifying the group and/or phase delay of the at least one branch light path.

11. Method according to claim 9, wherein modifying the optical properties of the at least one branch light path by operating at least one actuator occurs via one or more phase locked loops.

12. Method according to claim 9, wherein the at least one actuator comprises one or more of a temperature modification assembly, a fiber squeezer, a fiber stretcher, a free space optical path section having adjustable length, an electro-optic device or an acousto-optic device.

13. Method according to claim 12, wherein the fiber stretcher is a piezo drum.

14. Method according to claim 1, wherein the phase correction comprises post processing of data or a feed forward scheme.

15. Method according to claim 1, wherein for the at least one branch light path a second frequency mode $v_2$ different from the first frequency mode $v_1$ is used in an application supplied with light by the branch light path.

16. Method according to claim 15, wherein the phase correction comprises a frequency-transformation step such that the phase correction provides correction at the second frequency mode $v_2$ used by the application, although the phase correction uses the phase difference that was determined at the first frequency mode $v_1$.

17. Method according to claim 16, wherein the frequency-transformation step comprises the determination of a phase difference between a portion of the laser light coupled out at the reference point and another portion of the laser light coupled out at the measurement point at two distinct frequency modes $v_{ref, A}$, $v_{ref, B}$ of the frequency comb.

18. Method according to claim 17, wherein the two distinct frequency modes are at the first frequency mode $v_1$ and at a reference frequency mode $v_{1b}$.

19. Method according to claim 1, further comprising carrying out a reference measurement characterizing the relationship between the frequency of laser light running through the at least one branch light path and the phase difference between a portion of the laser light coupled out at the reference point and another portion of the laser light coupled out at the measurement point.

20. Method according to claim 19, comprising carrying out the reference measurement characterizing the ratio of the phase delay in the at least one branch light path for laser light at the first frequency mode $v_1$ and at the second frequency mode $v_2$.

21. Method according to claim 1, wherein light coupled out at the reference point and the light coupled out at the corresponding measurement point of a branch light path travels not more than 20 cm after being coupled out and before being used for the determination of the phase difference.

22. Optical frequency comb assembly, comprising:
a common light path;
an optical frequency comb source configured to generate laser light constituting an optical frequency comb and introducing the laser light into the common light path;
at least one branch light path seeded by the laser light from the common light path, the at least one branch light path comprising at least one optical element;
a phase measurement assembly configured to determine a phase difference of a first frequency mode $v_1$ of the optical frequency comb between laser light coupled out at a reference point within the frequency comb assembly upstream of the at least one optical element and laser light coupled out at a measurement point provided in the at least one branch light path downstream of the at least one optical element; and
a control unit configured to provide phase correction for the laser light from the at least one branch light path based on a deviation of the determined phase difference from a target value.

\* \* \* \* \*